Feb. 2, 1960 A. G. FOX 2,923,903
NONRECIPROCAL ELECTROMAGNETIC WAVE MEDIUM
Filed April 14, 1955 2 Sheets-Sheet 1

INVENTOR
A. G. FOX
BY *Roy M. Porter Jr.*
ATTORNEY

United States Patent Office 2,923,903
Patented Feb. 2, 1960

2,923,903

NONRECIPROCAL ELECTROMAGNETIC WAVE MEDIUM

Arthur G. Fox, Rumson, N.J., assignor to Bell Telephone Laboratories, Incorporated, New York, N.Y., a corporation of New York Application April 14, 1955, Serial No. 501,241

12 Claims. (Cl. 333—98)

This invention relates to nonreciprocal wave transmission devices and, more particularly, to devices producing a nonreciprocal rotation of the plane of polarization of linearly polarized electromagnetic wave power.

Lately the nonreciprocal Faraday-effect rotation produced by a magnetized element of gyromagnetic material has been exploited to provide numerous new and useful devices. A survey of many of these devices is to be found in an article entitled "Behavior and Applications of Ferrites in the Microwave Region" by A. G. Fox, S. E. Miller and M. T. Weiss in the Bell System Technical Journal, January 1955, pages 5 through 103. However, Faraday rotation in known gyromagnetic materials varies as a function of ambient temperature and operating frequency. Obviously the temperature variation is a disadvantage since it is impractical in most applications to operate the devices in temperature controlled media. Likewise, the frequency variation has the effect of limiting the operating bandwidth of the devices.

It is therefore an object of the present invention to produce a nonreciprocal polarization rotation of linearly polarized wave power that is independent of temperature and frequency variations.

In my copending application Serial No. 465,579 filed October 29, 1954, now United States Patent 2,834,944, granted May 13, 1958, and in the copending application of J. S. Cook Serial No. 465,578 filed October 29, 1954, there is disclosed for reciprocal devices a new principle of coupling between related transmission systems known as "normal mode tapering." Broadly stated, normal mode tapering operates by exciting one of the normal modes in a coupled wave guide system, and by tapering the phase constants and the coupling coefficient for the guides so as to cause the cross-sectional power distribution, characterizing the normal modes at any point, to change from point to point along the structure in a desired manner. Further definition of the normal mode and its characteristics will be found hereinafter. For more detailed consideration reference may be had to my above mentioned copending application.

It is important to realize that the desired shift of power depends upon the manner in which the wave guide parameters vary with distance along the coupler and not upon the absolute value of the individual phase constants of the coupled guides, the phase constant difference, or the coupling coefficient. Therefore a normal mode shift of power is broad band and variations of frequency which may effect the absolute values of the parameters but which do not alter their relative variation with distance will not effect the division of power.

In one aspect, it is an object of the invention to produce a nonreciprocal normal mode shift of electromagnetic wave power carried in orthogonal or cross polarizations in a conductively bounded wave guide.

In accordance with the present invention, a tapered pencil of gyromagnetic material is axially located in a conductively bounded guide, the cross-sectional dimensions of which vary from cross section to cross section along the longitudinal axis of the guide. Thus the phase constants and the gyromagnetic coupling between vertically and horizontally polarized components in the guide are chosen to produce the parameter variations required for a nonreciprocal normal mode transfer of power between these two polarizations. Such a transfer of power between these two polarizations is broad band and resembles a polarization rotation of ninety degrees. In one embodiment of the invention a certain amount of reciprocal phase shift is introduced to the polarizations to cause this rotation to simulate a nonreciprocal Faraday-effect rotation. Such a rotation may replace a Faraday rotation in many applications with the resulting advantage that it is extremely broad band, being limited only by the inherent frequency limitations of the wave guide components themselves and is substantially independent of the effects of temperature and frequency upon the gyromagnetic element.

These and other objects, the nature of the present invention, and its various advantages will appear more fully upon consideration of the various specific illustrative embodiments shown in the accompanying drawings and described in the following detailed description of these drawings.

Figure 1:
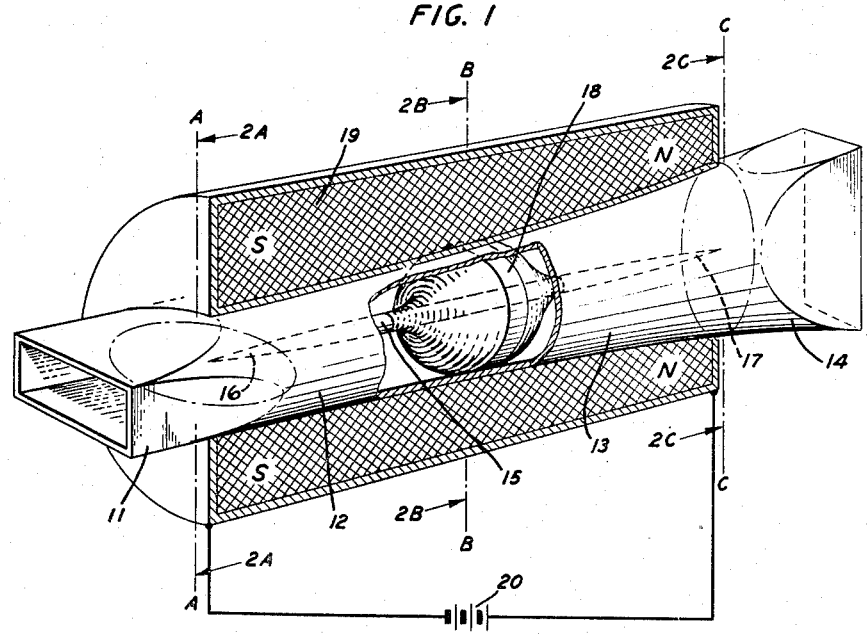
Fig. 1 is a perspective view of a polarization rotator, in accordance with the invention, for producing a ninety degree polarization rotation.
Figure 3:
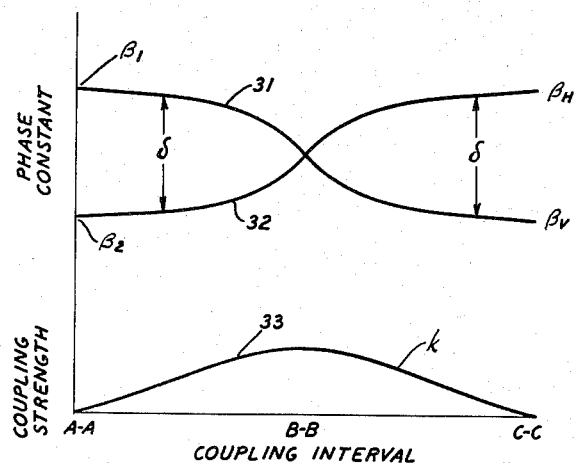
Figure 4:
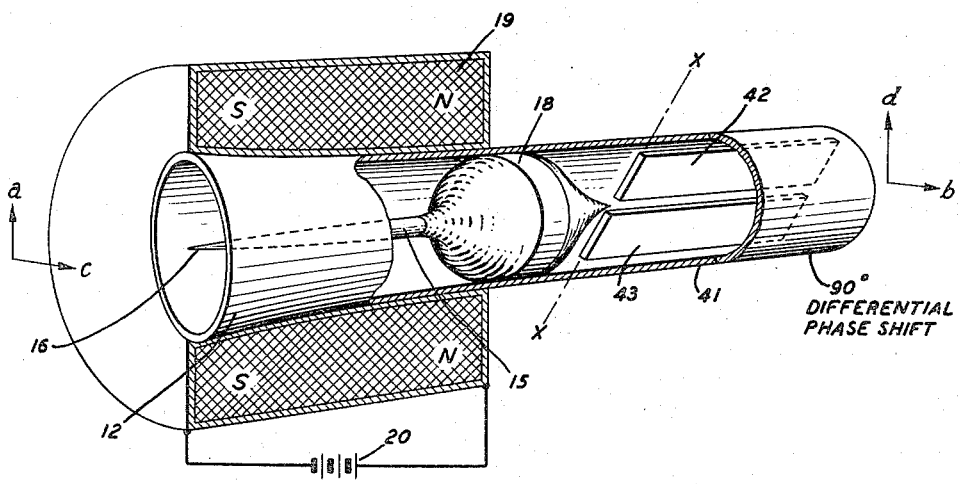

Fig. 3, given by way of explanation, shows the variation of the relative phase constants and the coupling coefficient for the vertically and horizontally polarized components along the rotator of Fig. 1; and Fig. 4 is a perspective view of a second embodiment of the invention wherein a ninety degree differential phase shift is added to one half of the embodiment of Fig. 1 to produce a nonreciprocal polarization rotation similar to the Faraday-effect.

Figure 2A:
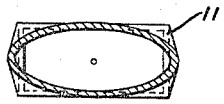
Figs. 2A through 2C are cross-sectional views taken at the indicated cross sections on the embodiment of Fig. 1.
Figure 2B:
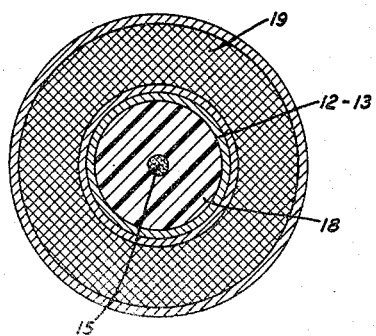
Figure 2C:
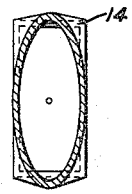

Referring more specifically to Fig. 1 and the cross-sectional views thereof in Figs. 2A through 2C, a broad band polarization rotator embodying the principles of normal mode tapering is shown as an illustrative embodiment in accordance with the invention. The rotator comprises a conductively bounded wave guide several wavelengths long comprising connected wave guide portions 11 through 14. Portion 11 tapers smoothly and gradually along its length from a rectangular transverse cross section at its left-hand end having the wire dimension thereof extending horizontally, into an ovoid transverse cross section having different perpendicular transverse dimensions at section A—A. As illustrated, section A—A has an elliptical cross section with its longer major axis in a horizontal position. Portion 12 then tapers from the elliptical cross section of section A—A into a symmetrical cross section at B—B, more particularly into a circular cross section. Between sections B—B and C—C portion 13 returns to an elliptical cross section having its longer major axis vertical. Portion 14 returns to a rectangular cross section having its wide dimension aligned with the longer axis in section C—C and therefore at right angles to the left-hand end of guide 11. Guide portions 11 through 14 may be formed as a single integral structure and may be produced in numerous ways, such as deforming a guide of original rectangular or circular cross section, or by electroforming upon a suitably shaped core.

This gradual cross-sectional deformation provides a transmission medium in which the phase constants of orthogonally related transmission paths, considering that independent paths support the vertically and horizontally polarized components of linearly polarized wave energy, are varied relative to each other along the medium from section A—A to section C—C in the manner shown in Fig. 3. Thus a vertically polarized component will have a phase constant $\beta_V$ as represented by curve 31, which commences at section A—A with a value equal to $\beta_1$, and is determined principally by the horizontal cross-sectional dimension of guide portions 11 and 12. The horizontally polarized component has a phase constant $\beta_H$ as represented by curve 32, which commences at section A—A with a value equal to $\beta_2$ which is less than $\beta_1$. The vertical phase constant as represented by curve 31 decreases between section A—A and section B—B, while the horizontal phase constant represented by curve 32 increases until the two constants are equal at section B—B. Between section B—B and section C—C the phase constant $\beta_H$ continues to increase and becomes substantially larger than the decreasing phase constant $\beta_V$.

The vertical and horizontal components are coupled to each other between section A—A and section B—B by means of an elongated rod or pencil-shaped element 15 of gyromagnetic material which is brought to pointed tapers 16 and 17 at its longitudinal ends for the reasons to be set forth hereinafter. Rod 15 is supported to extend longitudinally coaxial with guide 11—14 by extending it through the center of a supporting member 18 composed of dielectric material having a dielectric constant substantially equal to that of air and having conical tapered end faces to prevent undue reflections therefrom.

The material of rod 15 is of the type having electrical and magnetic properties of the type described by the mathematical analysis of D. Polder in Philosophique Magazine, January 1949, vol. 40, pages 99 through 115. More specifically, rod 15 may be made of any nonconducting ferromagnetic material. For example, it may comprise iron oxide with some of the oxides of one or more bivalent metals such as nickel, magnesium, zinc, manganese, and aluminum, combined in a spinel crystal structure. This material is known as a ferromagnetic spinel or as ferrite. Frequently these materials are first powdered and then molded with a small percentage of binder according to the process described in the publication of C. L. Hogan, "The Microwave Gyrator" in the Bell System Technical Journal, January 1952.

Rod 15 is biased or magnetized by an externally applied magnetic field, parallel to its longitudinal axis, and therefore parallel to the direction of propagation of waves in guide 11—14. This field may be supplied by a solenoid 19 mounted upon the outside of guide 11—14 and supplied by energizing current from source 20. To facilitate the explanation that follows, specific polarities are assigned to this field as indicated on the drawing, with the south pole thereof at the left-hand end of solenoid 19. It should be noted, however, that rod 15 may be magnetized in the opposite direction and by a solenoid of other suitable physical design, by a permanent magnet structure, or the gyromagnetic material of rod 15 may be permanently magnetized, if desired.

The coupling produced by rod 15 between the vertically and horizontally polarized components in guide 11—14 under these conditions can be explained by the recognition that the gyromagnetic material of rod 15 contains unpaired electron spins which tend to line up with the applied magnetic field. These spins have an associated magnetic moment which can be made to precess about the line of the biasing magnetic field, keeping an essentially constant moment component in the direction of the applied biasing field and at the same time providing a moment component which may rotate in a plane normal to the field direction. Thus, when a reciprocating high frequency magnetic field of electromagnetic wave energy is impressed upon the moment, the moment will commence to precess in one angular sense and to resist rotation in the opposite sense.

The combined effect of many such electrons and their associated moments produces in the gyromagnetic material not only a flux representing the impressed magnetic field, but also a flux representing the reciprocating field at right angles in space to the applied field. An effective field is then produced by the induced flux and may be thought of as an induced field at right angles to the inducing magnetic field. The relative strength of this induced field determines the degree of coupling at any finite cross section and depends upon the mass of the gyromagnetic material and the strength of the biasing field at that cross section. Therefore, as the cross section of rod 15, and therefore its mass, is tapered from substantially zero mass in section A—A to maximum mass in section B—B and then decreased to substantially zero mass in section C—C, a coupling characteristic between the vertically and horizontally polarized components is produced as represented by curve 33 of Fig. 3.

It is therefore noted from Fig. 3 that the vertically and horizontally polarized components in guide 11—14 have phase constants that are different by an amount $\delta$ from each other. At the positions of minimum coupling factor the difference $\delta$ is maximum, and this difference decreases to zero at the position of maximum coupling factor in the middle of the coupling region. The phase difference is of opposite sign on opposite sides of the middle so that the individual phase constants cross over each other. These characteristics comprise the pattern or order and arrangement of parameter variation disclosed in my said copending application to produce a shift of power distribution of the normal modes of the system.

Thus if a vertically polarized microwave signal is applied to guide 11 it will excite in the coupled system comprising the vertical and horizontal polarizations in guide 11—14 the field distribution defined in my said copending application as a "normal mode" of propagation. As there defined for a coupled wave guide system comprising two parallel, coupled, conductive wave guides, a "normal mode" is that field distribution of the wave energy propagated jointly in the guides that remains unchanged during propagation along a coupling region in which all characteristics remain unchanged including the phase, coupling coefficient, characteristic impedance and the attenuation constant. In a system having two modes of propagation between which power transfer is to be effected, there are two normal modes into which wave power propagating in one direction along the pair of coupled guides can be resolved. One of these modes is designated the low phase velocity normal mode, since the total field pattern of the mode comprises two portions of electrical intensity on opposite sides of the conductive boundary separating the two guides, which portions propagate together at a lower velocity than would a conventional wave in either of the guides alone. The other normal mode is designated the high velocity normal mode since the two portions of its intensity propagate jointly at a higher velocity than would a wave in either guide alone.

Now it may be shown mathematically that in a longitudinally biased gyromagnetic medium, the two normal modes constitute waves of positively and negatively rotating polarizations, respectively. For definition purposes, the following conventions are adopted herein and in the appended claims. The term "a wave of rotating polarization" is intended to include waves of "elliptical polarization" and waves of "circular polarization," the latter terms being considered as mutually exclusive. The terms "clockwise" and "counterclockwise" define the apparent sense of electric polarization rotation of these waves as viewed along the direction of propagation looking from the source. The terms "negatively" and "positively" as applied to the rotation of polarization refer to the sense of electric polarization rotation relative to the applied biasing field regardless of the direction of propagation. Thus a positive rotation is the polarization rotation of a wave which appears to be clockwise as viewed in the positive direction of the field, i.e., as viewed in Fig. 1 from guide portion 11 looking toward guide portion 14. A negatively rotating wave is one that appears to rotate in a counterclockwise sense as viewed in the positive direction of the field.

The fact that the normal modes in a gyromagnetic medium constitute the waves of negative and positive rotating polarizations is not surprising when it is seen that these are the only modes that can propagate either in synchronism or directly out of synchronism with the precessing spins of the electrons in the gyromagnetic material. For this reason the operation of substantially all gyromagnetic devices is currently analyzed in terms of waves of rotating polarization. The positively rotating mode which moves in synchronism with the electrons becomes the high phase velocity normal mode, while the negatively rotating mode which is opposed by the electrons becomes the low phase velocity normal mode. Each normal mode of rotating polarization is made up of two portions comprising the vertical and horizontal components, respectively, of each rotating wave. These two portions correspond to the two portions of electrical intensity on opposite sides of the conductive boundary of the linearly polarized normal mode mentioned above.

An essential factor in normal mode tapering is the ability to shift power from one of these portions into the other without, however, changing the basic configuration of the normal mode. As demonstrated in detail in said copending application, this shift involves the principle that a particular distribution of the normal mode power between the two portions at a given cross section is uniquely determined by the relationship between the phase constant difference and the coupling coefficient of the two wave paths supporting each portion at that cross section. When the two wave paths have substantially different phase constants and negligible coupling between them, a given normal mode will have all of its power in the portion supported in either one or the other of the paths. Therefore if power is introduced into one portion only, it will excite only one of the normal modes. As the phase constant difference is gradually decreased and the coupling increased, a shift of power in the normal mode will take place into the other portion. When the phase constants of the paths are equal the normal mode will have its power equally divided between the portions. If the phase constant difference is increased again, but in the opposite sense to produce a "cross-over" in the individual path phase constants, and the coupling decreased, the shift will continue until all power will appear in the second portion at a second point of negligible coupling.

It is a further characteristic of such a system that when power is initially delivered to the portion supported in the path having the larger phase constant it will excite in the coupled system the low phase velocity normal mode, which, in the present embodiment, is a wave having negatively rotating components. Similarly, if the energy is initially delivered to the portion supported in the path having the smaller phase constant, it will excite the high phase velocity normal mode, here a wave having positively rotating components. All this is demonstrated in detail in said copending application with the aid of illustrations showing typical field distributions. Also, desirable rates of variation of the phase constant difference and the coupling coefficient are defined, and optimum relationship between the phase difference and the coupling coefficient are given which may be employed in optimum adjustment of the present invention. For these and other details reference is made to said copending application.

In view of what has been restated here it is apparent that a vertically polarized wave applied to guide 11 will excite the low phase velocity normal mode in the coupled system since the phase constant for the vertical polarization is initially greater than the phase constant for the horizontal polarization. In the cross section A—A all power will be in the portion of the normal mode supported in the vertical polarization. Between sections A—A and B—B a normal mode shift of power will take place into the portion supported in the horizontal polarization producing a wave of rotating polarization until in section B—B equal portions will be found in the horizontal and vertical polarizations in the form of a negatively rotating circularly polarized wave. Since the phase constant characteristics of the horizontal and vertical polarizations cross over, the shift of power will continue until at section C—C all power will be in the horizontal polarization for delivery from guide 14.

If wave power is instead applied to guide 11 in a horizontal polarization, the power will now excite the high phase velocity normal mode in the coupled system. At section B—B equal portions of the power will be found in the horizontal and vertical polarizations in the form of a positively rotating circularly polarized wave. At section C—C all power will be in the vertical polarization for delivery from guide 14.

Similarly, transmission from guide 14 to guide 11 will take place by means of a shift in the distribution of the negatively rotating low phase velocity normal mode from a horizontal polarization applied to guide 14 into a vertical polarization in guide 11. Transmission from a vertical polarization in guide 14 to a horizontal polarization in guide 11 will be made in the positively rotating high phase velocity normal mode.

The properties of one half of the embodiment of Fig. 1 are quite unusual. Thus if the structure were cut at section B—B and only the left-hand part employed, a horizontal linearly polarized wave applied to guide 11 would emerge as a positive circularly polarized rotating wave from guide 12. Similarly, if a vertically polarized wave is applied to guide 11 it would emerge as a negative circularly polarized rotating wave from guide 12. This is the property of a reciprocal ninety degree differential phase shift section. However, unlike a reciprocal differential phase shift section, if the circularly polarized waves were reflected back into guide 12 they would emerge from guide 11 in the same polarization in which they originated. For comparison, it should be recalled that a similar round trip transmission through a reciprocal ninety degree phase shift structure produces a ninety degree polarization rotation. This unusual property of a half section of Fig. 1 is put to particular use in the novel combination considered hereinafter with reference to Fig. 4.

The independence of operation of the rotator from the effects of temperature and frequency variations on the ferrite material should now be apparent. Any variation that changes the magnetized permeability of the ferrite will have the effect of changing the specific value of the coupling coefficient $k$. However, this variation will be substantially uniform along the coupling interval so that the function according to which the coupling coefficient varies along the interval will not be substantially changed, and more particularly, the pattern that the variation follows will be unaffected. Since the absolute value of the coupling coefficient is not important with respect to normal mode tapering, this variation will in no way effect or change the broad band operation of the invention. This is true also of the embodiment now to be described.

One particularly useful combination making use of the properties of one half section of the embodiment of Fig. 1 to produce a stable nonreciprocal polarization rotator similar to the Faraday-effect is illustrated in Fig. 4. Thus the left-hand half of the structure of Fig. 1 is shown in Fig. 4 on which corresponding reference numerals are employed to denote corresponding components. The right-hand end of guide 12 is extended as a conductively bounded wave guide 41 of circular cross section. Suitable matching between sections 12 and 41 is provided by the tapers on support member 18. In section 41 is located suitable means for producing a conversion between linearly polarized waves applied to the right end of guide 41 and the circularly polarized waves existing at the right end of guide 12. As illustrated, this means may be a ninety degree differential phase shift section of any of the types disclosed, for example, in "Principles and Applications of Wave Guide Transmission" by G. C. Southworth, 1950, pages 327 through 331. By way of specific illustration, the phase shift section shown in Fig. 4 comprises two oppositely positioned conductive fins 42 and 43 each extending perhaps one quarter of the way across guide 41 and lying in a plane which is inclined forty-five degrees clockwise from the vertically polarized energy in guide 12. As is well known, if the lengths of fins 42 and 43 are such that a ninety degree delay is introduced to wave energy polarized parallel to the plane of the fins relative to wave energy polarized perpendicular to the plane of the fins, a vertically polarized wave applied to the right end of guide 41 is converted into a counterclockwise circularly polarized wave, i.e., a positively rotating wave viewed relative to the field, while a horizontal linearly polarized wave applied to the right end of guide 41 is converted into a clockwise rotating circularly polarized wave, i.e., a negatively rotating wave. Conversely, a positively rotating wave applied to the left end of guide 41 is converted into a horizontal linearly polarized wave while a negatively rotating wave is converted into a vertical linearly polarized wave.

The overall operation of the embodiment shown in Fig. 4 is that of a nonreciprocal polarization rotator that produces a ninety degree rotation of linearly polarized wave energy traversing through it in one direction but no rotation when traversing in the opposite direction. Thus a linearly polarized wave applied at the left end of guide 12 in the polarization represented by the vector $a$ is translated into a positively rotating wave between guides 12 and 41 and emerges at the right end of guide 41 in a polarization represented by the vector $b$. On the other hand, a wave applied at the right of guide 41 in the polarization $b$ is translated into a negatively rotating wave in the center and emerges at the left end of guide 12 in the polarization $c$. Similarly, an applied polarization $c$ emerges at the right in the polarization $d$, while an applied polarization $d$ emerges at the left in the polarization $a$. While this rotation is not precisely the same as that produced by the Faraday-effect, they are sufficiently equivalent that a device according to Fig. 4 may replace a Faraday-effect element in many applications. For example, by locating a pair of conjugate polarization selective branches at either end of the embodiment of Fig. 4, a nonreciprocal multibranch coupling network of the type known as a circulator circuit results. Unlike the Faraday-effect, however, the rotation produced by the present invention is independent of the effects of temperature and frequency variation upon the ferrite material as pointed out hereinabove. Uses of circulator circuits as well as other applications of polarization rotating devices are disclosed in the above mentioned Hogan publication and in the above mentioned publication of Fox, Miller and Weiss.

In all cases, it is understood that the above described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An electromagnetic wave device comprising a conductively bounded wave guiding structure capable of supporting orthogonally polarized components of electromagnetic wave energy, and an elongated member of magnetically polarized material exhibiting the gyromagnetic effect at the frequency of said wave energy extending longitudinally within a portion of said structure, said structure having phase constants for said orthogonal components that are substantially equal to each other at at least one point along said portion and that are substantially different one from the other along the major part of said portion.

2. An electromagnetic wave device comprising a conductively bounded wave guiding structure capable of supporting orthogonally polarized components of electromagnetic wave energy, and an elongated member of magnetically polarized material exhibiting the gyromagnetic effect at the frequency of said wave energy extending longitudinally within said structure, the mass of said member varying with distance along the length thereof, said structure having phase constants for said orthogonal components that are different one from the other along a substantial portion of the length of said member, said difference varying with distance along the length of said member inversely to said mass variation.

3. An electromagnetic wave device comprising a conductively bounded wave guiding structure capable of supporting orthogonally polarized components of electromagnetic wave energy, and means for coupling said components along a given longitudinal section of said structure comprising an elongated member of magnetically polarized material exhibiting the gyromagnetic effect at the frequency of said wave energy, the amplitude of said coupling varying smoothly between substantially different maximum and minimum coupling values at different points along said section, said guiding structure having separate phase constants for each of said orthogonal components, the difference between said phase constants varying smoothly along said section with a maximum difference at substantially the point of minimum coupling and a minimum difference at substantially the point of maximum coupling.

4. A device according to claim 3 wherein said coupling amplitude is determined by the mass of said member and wherein said mass is tapered from zero at one end of said section to a maximum at another point along said section.

5. A device according to claim 3 wherein said phase constant difference is maximum at one end of said section and zero at the center of said section.

6. A device according to claim 3 wherein said phase constant difference is maximum at one end of said section and zero at the other end of said section.

7. In combination with a device according to claim 3, means for producing a ninety degree differential phase shift between two orthogonal planes of wave energy polarization, said means being located in the path of said orthogonally polarized components with said planes of phase shift inclined at an acute angle to said orthogonal components.

8. An electromagnetic wave device comprising a conductively bounded wave guiding structure capable of supporting the orthogonally polarized components of a wave of rotating polarization, an elongated member of magnetically polarized material exhibiting gyromagnetic effects at the frequency of said wave energy extending longitudinally within a portion of said structure, said structure having phase constants for said orthogonally polarized components that are substantially equal to each other at one end of said portion and substantially different from each other at the other end of said portion, and means for converting between said waves of rotating polarization and linearly polarized waves located adjacent said one end of said portion.

9. An electromagnetic wave device comprising a conductively bounded wave guiding structure having an ovoid transverse cross section at at least one longitudinal position and a symmetrical transverse cross section at another longitudinal position, said wave guiding structure varying smoothly and continuously from said ovoid cross section to said symmetrical cross section, and an elongated element of magnetically polarized material exhibiting gyromagnetic effects over the range of frequencies supported by said structure extending longitudinally within said structure between said positions.

10. A device in accordance with claim 9 wherein said ovoid cross section is elliptical and wherein said symmetrical cross section is circular.

11. In combination, a conductively bounded wave guiding structure that varies smoothly and continuously from a transverse cross section having orthogonally related dimensions of different magnitudes at one longitudinal location to a transverse cross section having orthogonally related dimensions of the same magnitudes at another longitudinal location, an elongated member of material exhibiting gyromagnetic effects over the range of frequencies supported by said structure extending longitudinally within said structure between said locations, and a magnetizing field applied longitudinally to said member.

12. A nonreciprocal polarization rotator for linearly polarized electromagnetic wave energy comprising a conductively bounded wave guide section having an elliptical transverse cross section at one end and a circular transverse cross section at the other end, said wave guide section varying smoothly and continuously from said elliptical cross section to said circular cross section, an elongated element of magnetically polarized material exhibiting gyromagnetic effects at the frequency of said wave energy extending longitudinally within said structure between said ends, and a ninety degree differential phase shift section connected to said other end of said guide section with the planes of differential phase shift thereof inclined at forty-five degrees to the elliptical axes of the cross section at said one end.

References Cited in the file of this patent

UNITED STATES PATENTS

| | | |
|---|---|---|
| 2,607,031 | Denis | Aug. 12, 1952 |
| 2,607,849 | Purcell | Aug. 19, 1952 |
| 2,719,274 | Luhrs | Sept. 27, 1955 |
| 2,741,744 | Driscoll | Apr. 10, 1956 |
| 2,774,945 | Miller | Dec. 18, 1956 |
| 2,830,289 | Zaleski | Apr. 8, 1958 |

FOREIGN PATENTS

| | | |
|---|---|---|
| 511,649 | Belgium | June 14, 1952 |

OTHER REFERENCES

Sakiotis et al.: "Microwave Antenna Ferrite Applications," Electronics, June 1952, pp. 156, 158, 162 and 166.